United States Patent [19]
Guerin

[11] Patent Number: 5,272,715
[45] Date of Patent: Dec. 21, 1993

[54] MULTI-BEAM LASER DIODE BEAM SEPARATION CONTROL

[75] Inventor: Jean-Michel Guerin, Glendale, Calif.

[73] Assignee: Xerox Corporation, Stamford, Conn.

[21] Appl. No.: 933,138

[22] Filed: Aug. 21, 1992

[51] Int. Cl.$^5$ .............................................. H01S 3/08
[52] U.S. Cl. ........................................ 372/98; 372/23
[58] Field of Search ................... 372/23, 98, 100, 108, 372/107, 99; 359/837, 641, 737

[56] References Cited

U.S. PATENT DOCUMENTS 4,933,949  6/1990  Johnson ................................ 372/23

Primary Examiner—Léon Scott, Jr.
Attorney, Agent, or Firm—Fariba Rad

[57] ABSTRACT

A multi-beam raster output scanner is disclosed which utilizes a deflection wedge for modifying the beam separation independent of the spot size to generate a desired relationship between spot separation and spot size. The beam separation can be modified by moving the deflection wedge back and forth. Depending on the distance between the deflection wedge and a spot size control aperture, the beam separation varies. In this invention, as in the prior art, the spot size can be modified by changing the size of the control aperture, but to avoid the loss of intensity, the size of the control aperture will be changed only for fine adjustments to achieve the proper spot size.

3 Claims, 5 Drawing Sheets

MULTI-BEAM LASER DIODE BEAM SEPARATION CONTROL

BACKGROUND OF THE INVENTION

This invention relates to a multi-beam laser diode used in a raster output scanner and, more particularly, to a raster output scanner which uses a deflection wedge to control the laser diode beam separation.

Referring to FIG. 1, a sagittal view of a conventional multi-beam raster output scanner is shown which utilizes a multi channel laser diode 10, a collimating lens 18, a spot size control aperture 20, a Fourier Transform/focusing lens 28 and a scanning polygon (not shown) and a photoreceptor plane P. Hereinafter, Fourier Transform/focusing lens 28 is referred to as focusing lens 28. In order to collimate each beam 12, coming from the laser diode 10, the collimating lens 18 is placed one focal length $f_1$ away from the laser diode 10. The collimating lens 18 receives several beams 12 from different channels of the laser diodes 10. The collimated light beams emerging from the collimating lens 18 start converging towards each other and they all cross each other at the focal point 19. The spot size control aperture 20 is placed at the focal plane for clipping the light. After passing through the spot size control aperture 20, the collimated beams 12, which have crossed each other at the focal point 19, start diverging from each other. The focusing lens 28 is placed at one focal length $f_2$ away from the spot size aperture 20. After passing through the focusing lens 28 and through the standard imaging optics (not shown), the beams 12 individually focus to a spot with a spot size 38 on the photoreceptor plane P. At the photoreceptor plane P, there is a distance 36 between the centers of adjacent spots and hereafter is referred to as spot separation.

In multi-beam scanning systems, the spot separation 36 relative to the spot size 38 is an important element. It should be noted that the spot separation 36 is the distance between the center rays of adjacent light beams 12. Simultaneous scanning of multiple spots requires a selection of proper spot separation to spot size at the photoreceptor plane. In a multi channel laser diode, there is a limit in placing the channels close to each other. If the channels are placed too close to each other, then the problem of cross-talk arises. Cross-talk happens when the information from one channel leaks into the adjacent channel due to closeness of the channels. To reduce the cross-talk problem, the channels separation on the multi channel laser diode is increased which in turn generates a larger spot separation. Therefore, to achieve the proper spot separation 36 to the spot size 38, the spot separation 36 or the spot size 38 should be modified. To modify the relative spot separation 36 to the spot size 38, either the spot separation has to be decreased or the spot size has to be increased.

In the conventional multi-beam raster output scanner, shown in FIG. 1, only the spot size can be modified. By changing the size of the control aperture 20, the spot size can be changed. The spot size has an inverse relationship with the size of the control aperture 20. Normally, the relative spot separation to the spot size is too high and therefore the spot size has to be increased. For example, in order to double the spot size, the control aperture 20 should clip the beams at 63% of their diameter which results in 20% loss of intensity. Moreover, there is no element in the design of the conventional multi-beam raster output scanners which can modify the spot separation independently. Different optics used in the raster output scanners change the spot separation and the spot size at the same rate. Therefore, the relative spot size to spot separation stays the same. Since there are no means to modify the spot separation independent of the spot size, in order to achieve the proper spot separation 36 relative to the spot size 38, the only option is to clip the radius of the beams at the price of losing intensity.

SUMMARY OF THE INVENTION

The present invention is directed to a multi-beam raster output scanner which utilizes a deflection wedge for modifying the beam separation independent of the spot size to generate a desired relationship between spot separation and spot size. The beam separation can be modified by moving the deflection wedge back and forth. Depending on the distance between the deflection wedge and a spot size control aperture, the beam separation varies. In this invention, as in the prior art, the spot size can be modified by changing the size of the control aperture, but to avoid the loss of intensity, the size of the control aperture will be changed only for fine adjustments to achieve the proper spot size.

DESCRIPTION OF THE PREFERRED EMBODIMENT

Figure 2:
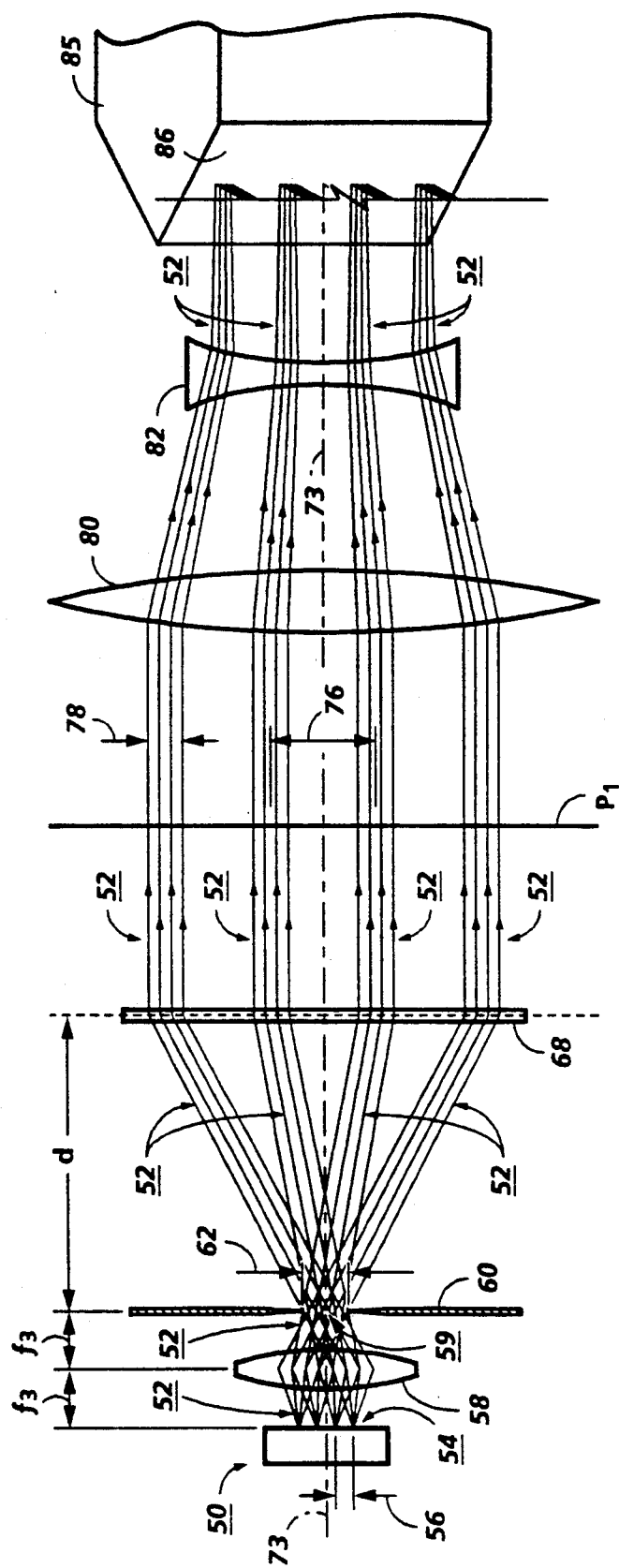
FIG. 2 is a sagittal view of a multi-beam raster output scanner of this invention.
Figure 2A:
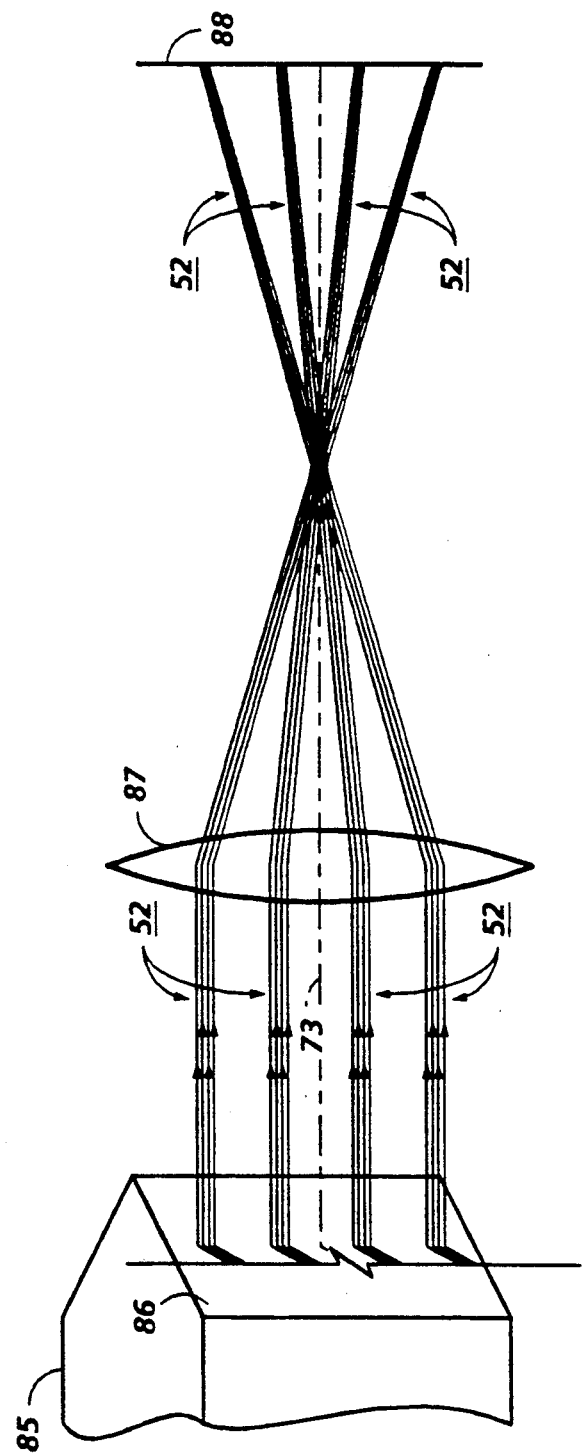
FIG. 2A is a sagittal view of the beams reflected from a polygon shown in FIG. 2 onto a photoreceptor.

Referring to FIGS. 2 and 2A, a raster output scanner of this invention is shown which utilizes a multi channel laser diode 50, a collimating lens 58, a spot size control aperture 60, a deflection wedge 68, a demagnifying lens set 80 and 82, a polygon 85, a scanning optics 87 and photoreceptor 88. In order to collimate each beam 52 coming from the laser diode 50, the collimating lens 58 is placed one focal length $f_3$ away from the laser diode 50. The collimating lens 58 receives several beams 52 from different channels of the laser diodes 50. The collimated light beams emerging from the collimated lens 58 start converging towards each other and they all cross each other at the focal point 59. The spot size control aperture 60 is placed at a focal length $f_3$ away from the collimating lens 58. After passing through the spot size aperture 60, the collimated beams 52 start diverging from each other. Since the beams 52 are diverging from the focal point 59, each beam starts separating from its neighboring beams as they move away from the focal point 59.

The deflection wedge 68 is placed in the path of diverging beams 52 at a distance d from the control aperture 60. At distance d, the beams 52 are properly separated from each other. The deflection wedge 68 deflects the light beams in such a manner that all the beams emerging from the deflection wedge 68 are parallel to the optical axis 73 and they are still collimated. The beams 52 emerging from the deflection wedge 68 are not perfectly collimated as they slightly diverge from focal point 59, but since the divergence is very minimal, all the rays in each beam will be considered to be parallel to the optical axis, as shown in FIG. 2, for illustration purposes.

Still referring to FIGS. 2 and 2A, since the beams 52, emerging from the deflection wedge 68, are collimated, the spot size 78 and the spot separation 76 are fixed and can be measured across beams 52 at any location between the deflection wedge 68 and the demagnifying lens 80. The relative spot separation to the spot size is a critical factor in multi beam scanning. Simultaneous scanning of multiple spots requires a selection of proper relative spot separation to spot size at the photoreceptor 88.

Figure 3:
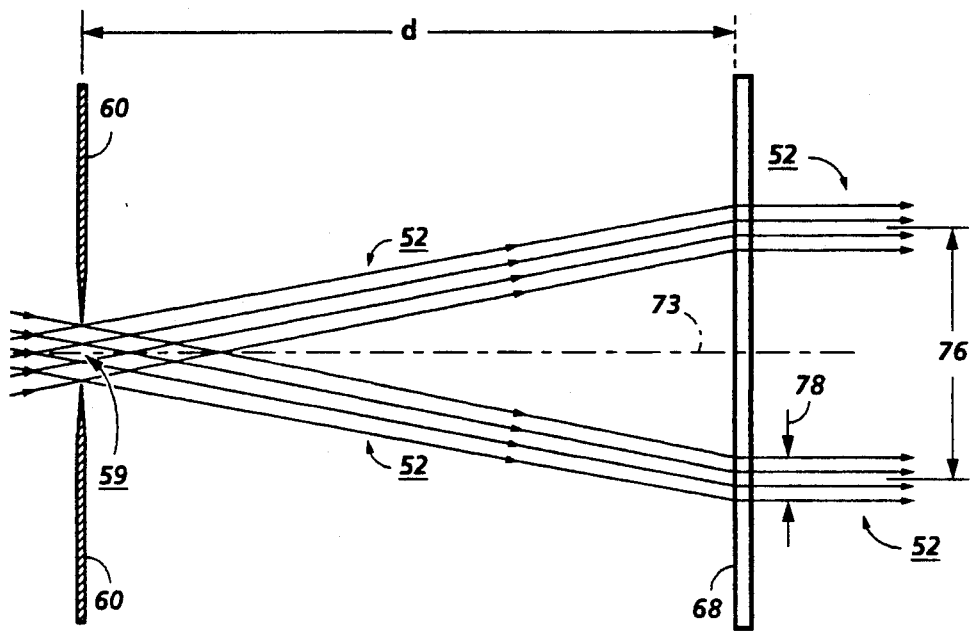
FIG. 3 is a magnified portion of FIG. 2.
Figure 3A:
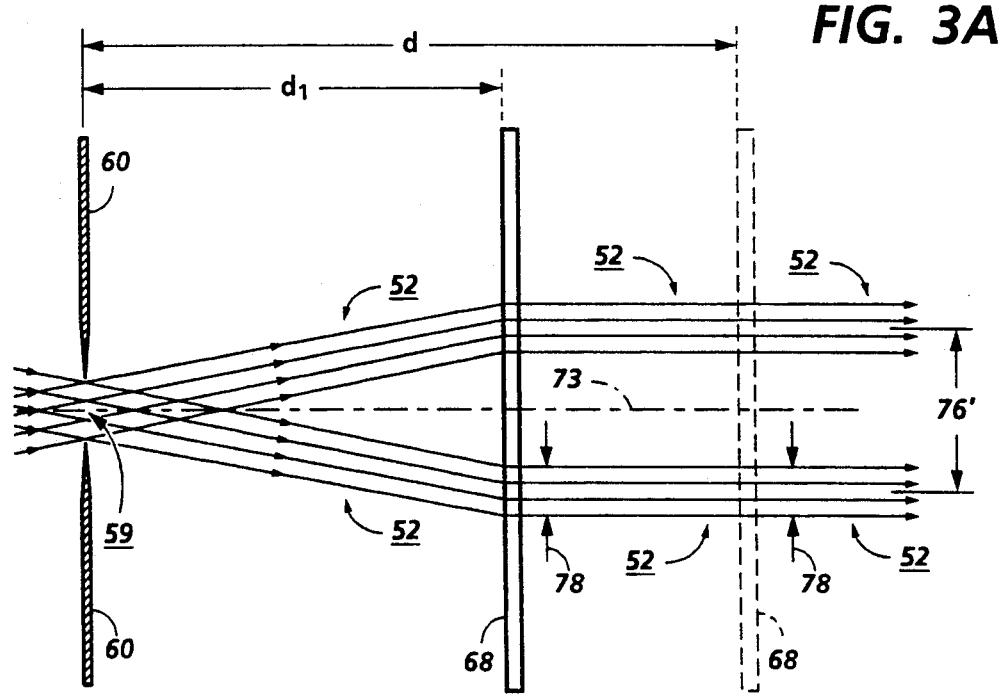
FIG. 3A shows the deflection wedge of FIG. 3 in a different position.

Referring to FIG. 3, a portion of FIG. 2 is magnified and also for simplicity only two beams are shown. The spot separation 76 depends on the location of the deflection wedge 68. By moving the deflection wedge back and forth, the spot separation changes. Referring to FIG. 3A, if the deflection wedge 68 is placed at a distance $d_1$, closer to the control aperture, since there is less separation 76' between the beams 52, the beams 52 will have a smaller spot separation 76'. However, if the deflection wedge 68 is moved away from the control aperture and since there is more separation between the beams 52, the beams 52 will have a larger spot separation.

Referring back to FIG. 2, in this invention, not only the spot separation 76 can be modified by moving the deflection wedge 68 back and forth, but also the spot size 78 can be modified by adjusting the control aperture 60. The spot size 78 is determined by the waist size 62 and the amount of aperturing at the focal point 59. In the same manner as in the prior art, in this invention, the spot size can be modified by adjusting the control aperture. By having two adjustable optical elements, deflection wedge and the control aperture, a proper spot separation 76 to the spot size 78 can be acquired.

To achieve the desired relationship of spot separation 76 to the spot size 78, the major modification will be done on the spot separation 76 by the deflection wedge 68. Since modifying the spot size 78 by the control aperture 60 results in an undesirable intensity loss, in this invention, the control aperture 60 will only be used for fine adjustments of spot size 78 thus keeping the intensity loss at its minimum. Once the relative spot separation 76 to the spot size 78 is adjusted, the relationship stays constant through out the following optical levels. This means that the spot size 78 and spot separation 76 both change by the same factor at conjugate image planes between the deflection wedge 68 and the photoreceptor 88. Therefore, the relative spot separation 76 to the spot size 78 stays constant.

It should be noted that the raster output scanner of this invention is designed for a nominal distance d and the nominal opening of the aperture. However, in manufacturing, due to the performance deviation of the different elements the spot separation and spot size on the photoreceptor may be slightly different than the precise spot separation and spot size. Therefore, during the assembly of the raster output scanner, the deflection wedge will be moved slightly and the opening of the aperture will be adjusted slightly to acquire precise spot separation and spot size on the photoreceptor. Once the precise spot separation and spot size are acquired, then the deflection wedge and the aperture will be fixed.

Referring to FIGS. 2 and 2A, the light beams emerging from the deflection wedge 68 generate spot separations and spot sizes larger than the spot separations and the spot sizes needed on the photoreceptor 88. Therefore, a demagnifying lens set 80 and 82 are needed to produce the required spot separation and the required spot size on the photoreceptor 88. The demagnifying lens set 80 and 82 reduces both the spot size and the spot separation by the same factor and thus keeps the relative spot separation to the spot size constant. The beams 52 are projected onto the facet 86 of the polygon 85 and are reflected onto a scanning optics 87. The scanning optics 87 is placed between the facet 86 and the photoreceptor 86 to transfer the image from the facet 86 of the polygon 85 to the photoreceptor 88 while keeping the spot separation and the spot size the same. The photoreceptor is located on the conjugate plane of the scanning optics 87.

Figure 1:
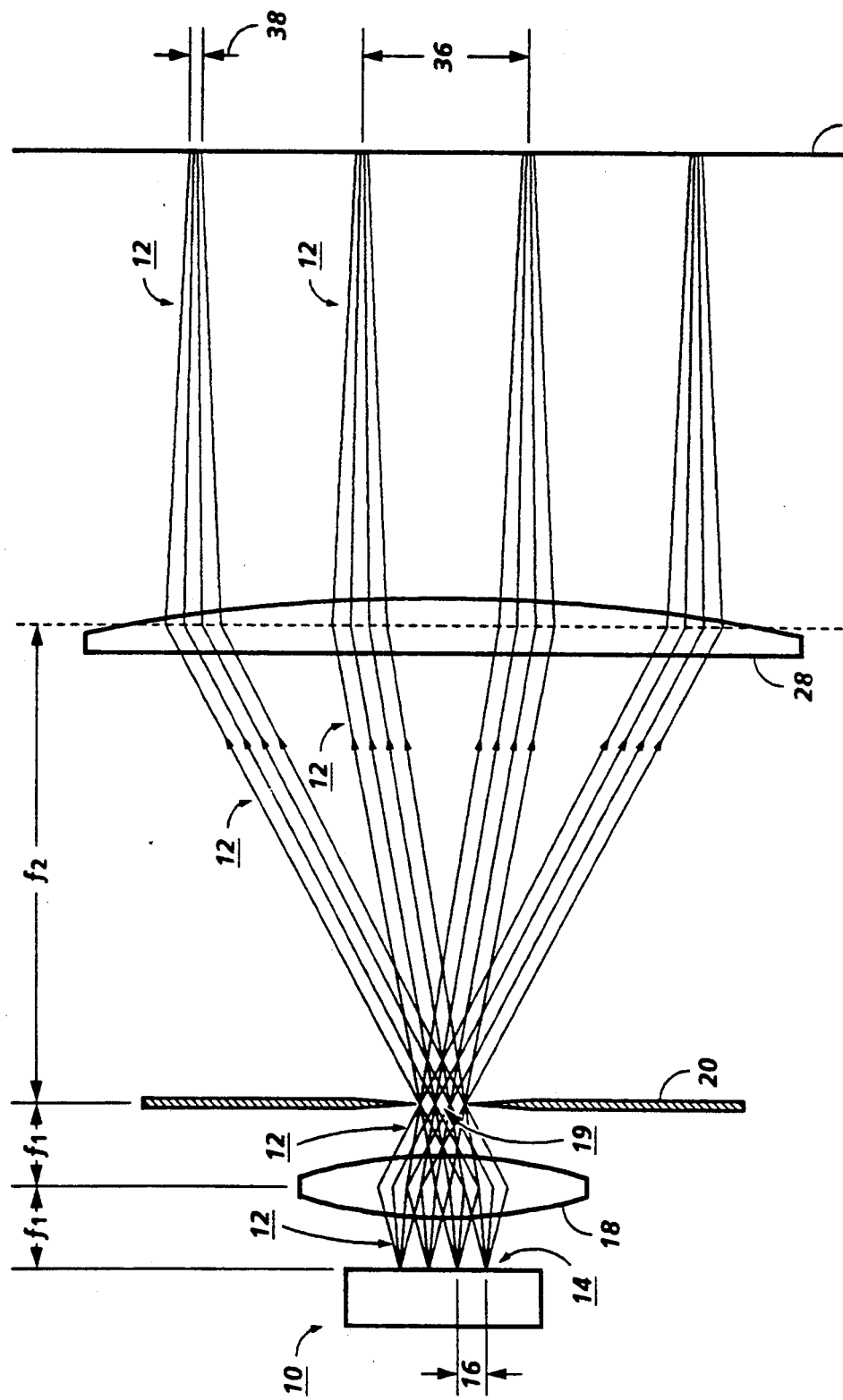
FIG. 1 is a sagittal view of a prior art multi-beam raster output scanner.

Referring to FIG. 1, if in the prior art, the control aperture 20 is set for not clipping the light beams 12 and the collimator lens 18 has a large numerical aperture, the relative spot separation 36 to the spot size 38 at the photoreceptor plane P is the same as the relative spot separation 16 to the spot size 14 at the laser diode 10. This is due to the fact that the control aperture 20 is the only means for modifying the relative spot separation to the spot size, which in this case is set for no clipping. Therefore, in the prior art, the spot separation and the spot size are not independent variables.

Referring back to FIG. 2, in contrast to the prior art, if the control aperture 60 of this invention is set for not clipping the light beams 52, the relative spot separation 76 to the spot size 78 at the photoreceptor can be different than the relative spot separation 56 to the spot size 54 at the laser diode 50. Depending on the location of the deflection wedge 68, the spot separation can have different values. In this invention, the spot size 78 and the spot separation 76 are independent variables. The spot separation 76 on the photoreceptor 88 can be modified by moving the deflection wedge 68 back and forth while the spot size 78 stays constant.

The optical elements down stream of deflection wedge 68 are used to demagnify or deflect the light beams. When the light beams pass through the optical elements down stream of deflection wedge 68, the relative spot separation to the spot size stays constant, i.e. the spot separation and the spot size change at the same rate at conjugate image planes; change in one is accompanied by change in the other.

Figure 4:
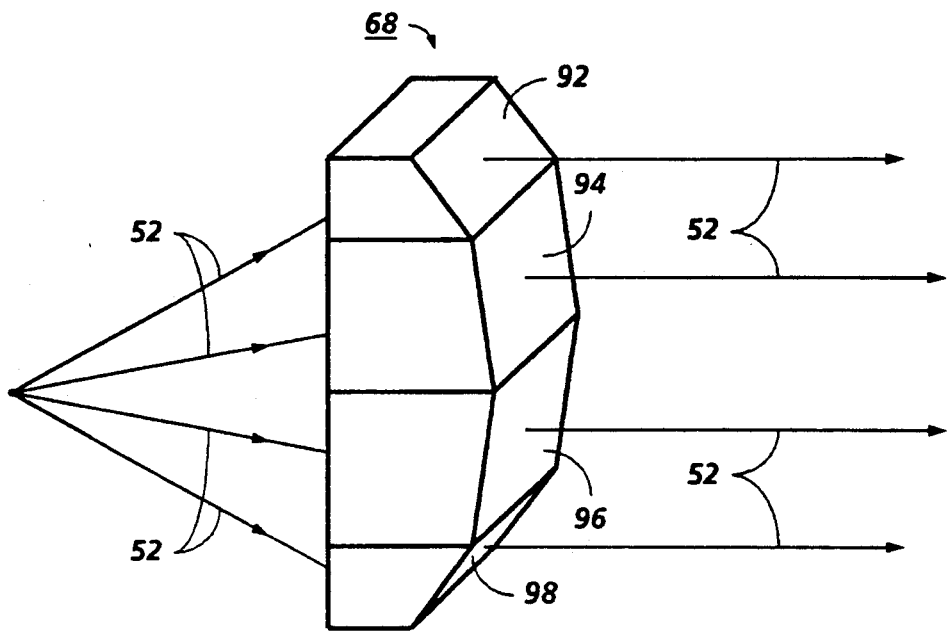
FIG. 4 is a perspective view of a deflection wedge.
Figure 4A:
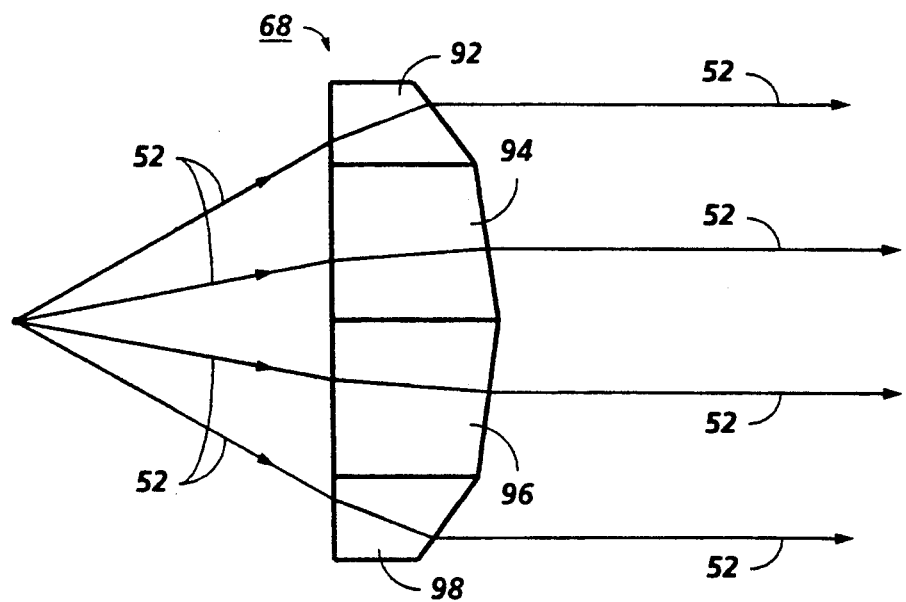
FIG. 4A is a sagittal view of the deflection wedge of FIG. 4.

Referring to FIGS. 4 and 4A, a deflection wedge 68 with four small wedges 92, 94, 96 and 98 are shown. For simplicity, only the center rays of each beam 52 is shown. When the beams 52 travel through the wedges 92, 94, 96 and 98, each beam will be deflected in a different angle in order to produce four parallel beams. Each wedge is designed to deflect a certain light beam and since the deflection wedge 68 has four different wedges 92, 94, 96 and 98, it is designed to deflect four different light beams approaching the wedge at different angles. The length of each wedge is in the range between 0.5-2.0 millimeter.

To make a deflection wedge, it is difficult to use individual glass wedges and abut them together. The difficulty arises from the fact that the corners of the each individual wedge, with small dimensions such as millimeter, have to be polished and precise angles have to be formed.

An alternative to make a deflection wedge is to mold plastic. A mandrel can be made to have profiles of the small wedges 92, 94, 96 and 98. Then, a piece of plastic can be molded to take the shape of the mandrel. This approach avoids the problem of polishing glass wedges with small dimensions.

An alternative to the deflection wedge disclosed in the embodiment of this invention is to use a binary diffraction optics. A binary diffraction optics can be designed to have four different groups of grooves to operate in the same manner as the deflection wedge.

What is claimed is:

1. A raster output scanner comprising:
   a multi-beam laser light source emitting a plurality of light beams;
   collimating means located in the path of said plurality of light beams from said laser light source and being so constructed and arranged to collimate said plurality of light beams;
   a deflection means located in the path of said plurality of light beams at a location where said plurality of light beams diverge from each other, said deflection means being so constructed and arranged to emit said plurality of light beams generally parallel to each other;
   a medium;
   a scanning means located in the path of said beams from said deflection means and being so constructed and arranged to scan said beams across said medium;
   said collimating means being optically located between said light source and said deflection means; and
   said deflection means being optically located between said collimating means and said scanning means.

2. The structure as recited in claim 1, wherein said deflection means is movable along the optical path for adjusting the distance between said plurality of generally parallel light beams emitted from said deflection means.

3. The structure as recited in claim 1, wherein said medium is a photoreceptor.

* * * * *